May 7, 1946.    E. R. ARMSTRONG    2,399,611
SUBMERSIBLE SEADROME
Filed May 14, 1942    6 Sheets-Sheet 1
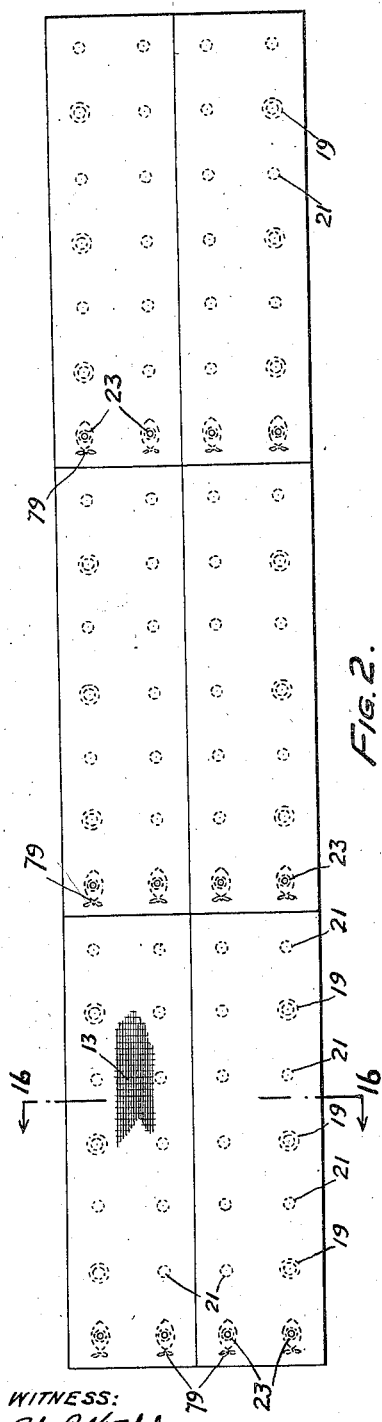
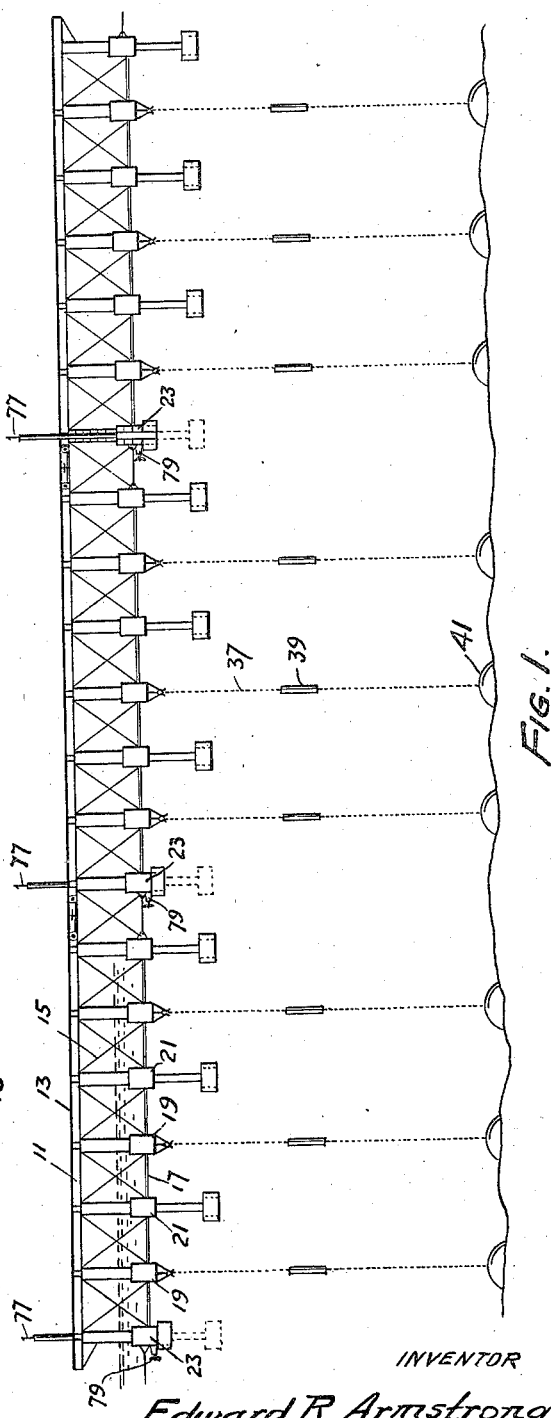
INVENTOR
Edward R. Armstrong
BY Busser & Harding
ATTORNEYS.

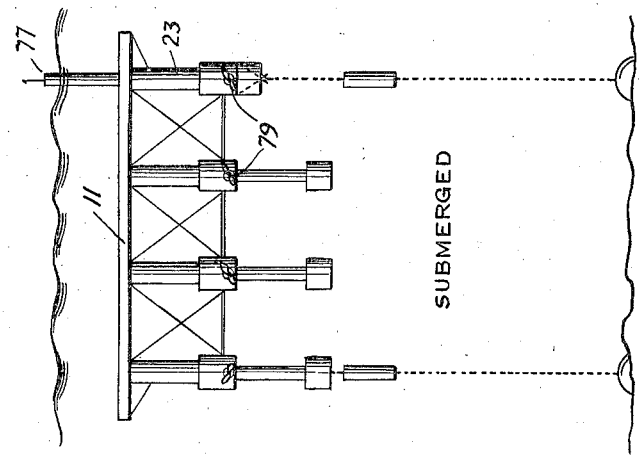
FIG. 5. SUBMERGED
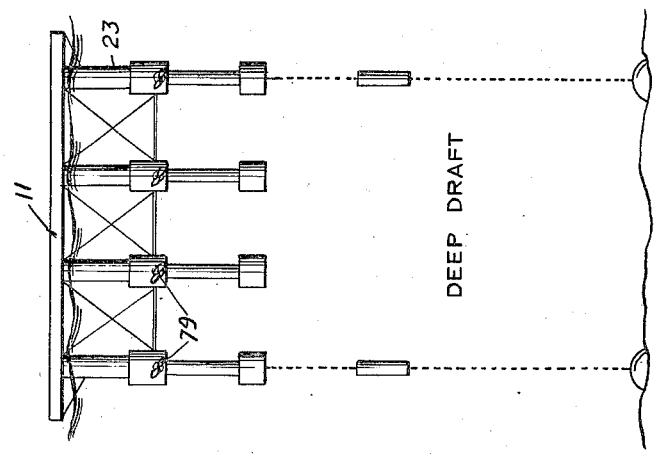
FIG. 4. DEEP DRAFT
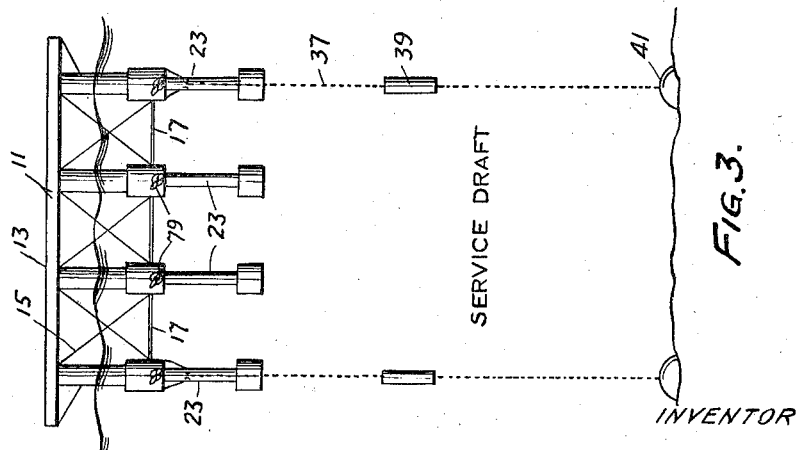
FIG. 3. SERVICE DRAFT May 7, 1946. E. R. ARMSTRONG 2,399,611
SUBMERSIBLE SEADROME
Filed May 14, 1942 6 Sheets-Sheet 4

WITNESS:

INVENTOR
Edward R. Armstrong
BY
ATTORNEYS.

May 7, 1946.  E. R. ARMSTRONG  2,399,611
SUBMERSIBLE SEADROME
Filed May 14, 1942  6 Sheets-Sheet 5
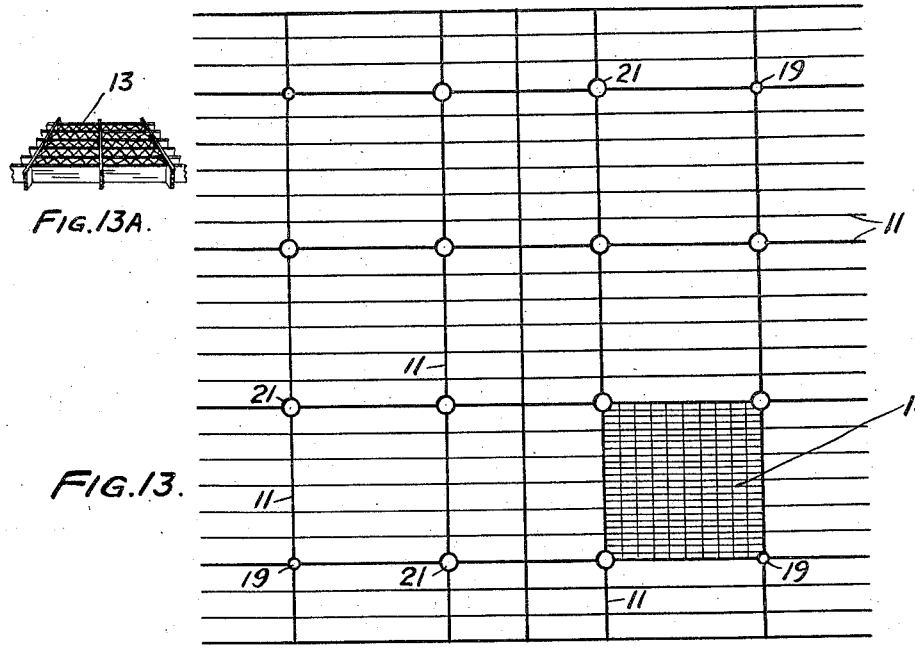
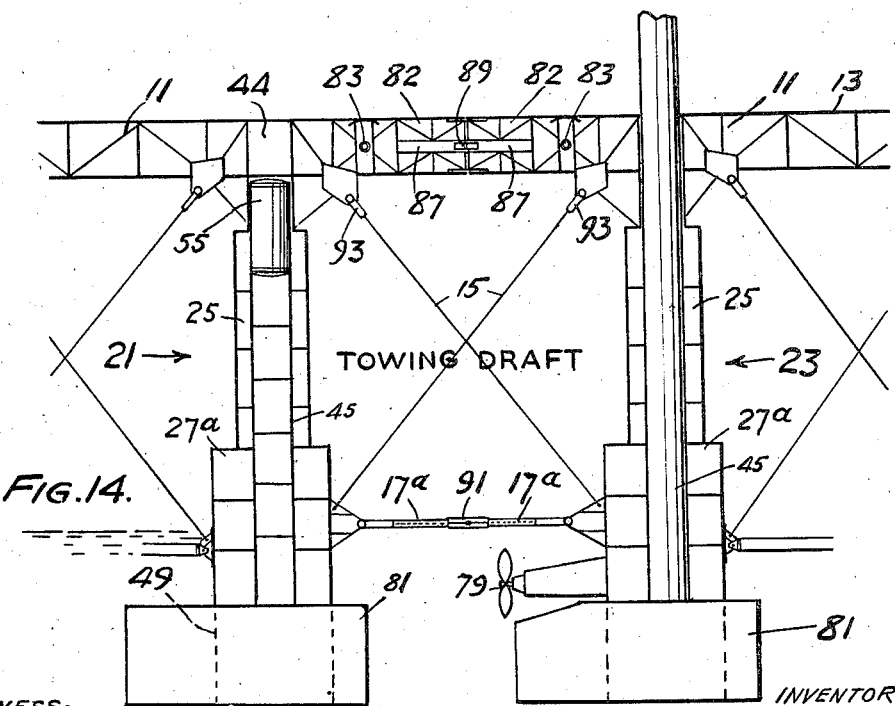
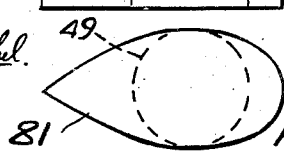

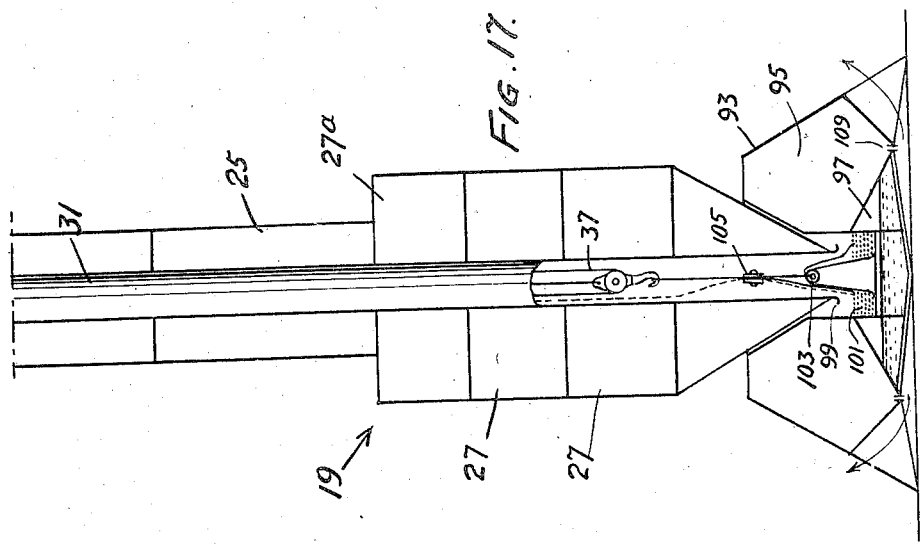
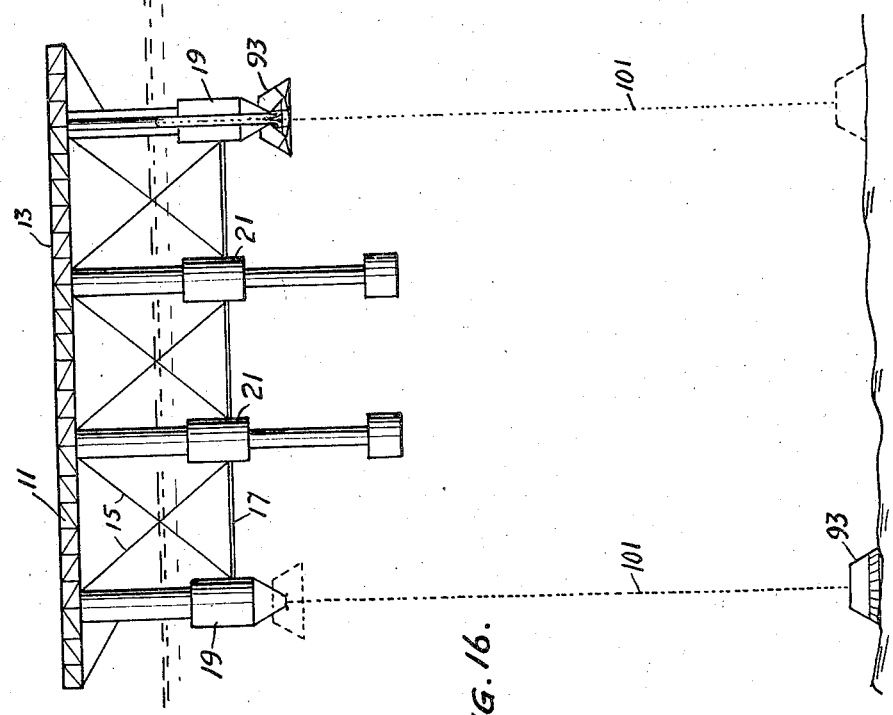

Patented May 7, 1946

2,399,611

UNITED STATES PATENT OFFICE 2,399,611

SUBMERSIBLE SEADROME

Edward R. Armstrong, Overbrook, Pa.

Application May 14, 1942, Serial No. 442,997

5 Claims. (Cl. 114—43.5)

This invention is directed to an improved submersible-type seadrome, particularly designed for use at sea as a servicing and refueling base for aircraft in wartime.

It is generally agreed that during time of war the use of normal seadrome-type structures at sea as refueling and servicing bases for aircraft would be of great strategic value were it not for their vulnerability to air attack. This is due to their large area, lack of mobility, and the relatively unprotected position that their use as airports in such service would entail. To eliminate this hazard, which now limits their usefulness, the standard seadrome design has been modified in accordance with the present invention so that a structure of this type can be quickly and safely submersed below the surface of the ocean to that depth necessary to render bombing from the air ineffective, even if its general location should become known to the enemy.

It is therefore the object of the present invention to provide a seadrome-type structure which will possess the necessary stability when in use, and yet can be readily and rapidly submerged beneath the ocean surface to a depth sufficient to afford the protection desired.

This object is accomplished, broadly, by the provision of a seadrome structure having very considerably residual buoyancy which is anchored to the sea bottom through the medium of "haul down" mechanism.

The construction and operation of such a structure will be apparent from the following description, read in conjunction with the accompanying drawings, in which:

Figure 1 is a diagrammatic side elevation of the seadrome structure, anchored to the sea bottom, and riding at normal service draft.

Figure 2 is a diagrammatic plan view of the structure shown in Fig. 1.

Figure 3 is a diagrammatic end elevation of the structure shown in Fig. 1, showing it riding at normal service draft.

Figure 4 is a similar view of the same structure, showing it riding at deep draft.

Figure 5 is a similar view of the same structure, showing it submerged.

Figure 13 is a diagrammatic plan view of a portion of the deck structure.

Figure 13A is a detail view of the deck grid.

Figure 14 is a diagrammatic view of a portion of the seadrome structure showing the releasable connections between sections, and the buoyancy units as arranged at towing draft.

Figure 15 is a sectional view on the line 15—15 in Fig. 14.

Figure 16 is a diagrammatic sectional view on the line 16—16 in Fig. 2, showing a modified type of anchoring mechanism.

Figure 17 is a detail diagrammatic view of the type of anchor shown in Fig. 16.

Figures 6, 7, 8:
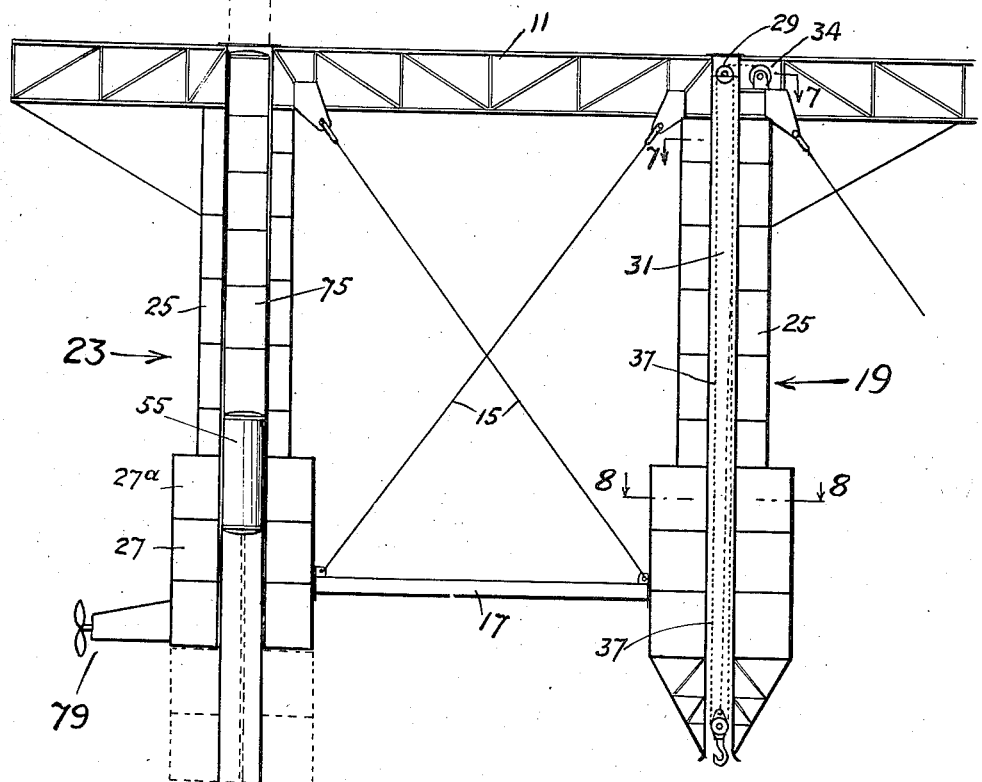
Figure 6 is a diagrammatic view of a portion of the seadrome structure showing two types of buoyancy units used.
Figure 7 is a sectional view on the line 7—7 in Fig. 6.
Figure 8 is a sectional view on the line 8—8 in Fig. 6.
Figure 10:
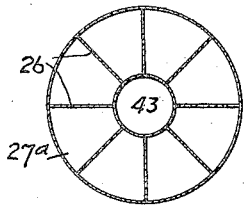
Figure 10 is a sectional view on the line 10—10 in Fig. 9.
Figure 12:
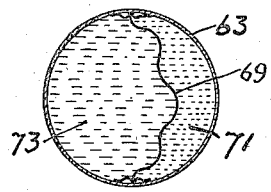
Figure 12 is a sectional view through one of the storage tanks shown in Fig. 11.
Figure 11:
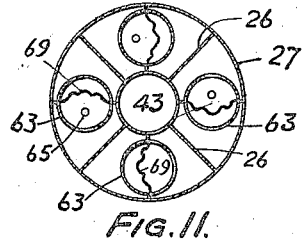
Figure 11 is a sectional view on the line 11—11 in Fig. 9.

The seadrome structure in accordance with this invention will preferably comprise a plurality of substantially identical sections releasably secured together to form a structure of desired size. In Figs. 1 and 2 three such sections are secured together. Each section may, for example, have a deck surface of 400 by 700 feet, so giving a total deck surface for the seadrome of 400 by 2100 feet.

Each section comprises a deck structure formed from longitudinal and transverse trusses 11 which support a grid 13 provided with rather large openings to facilitate easy submergence and emergence. The deck structure is secured to and supported by a plurality of buoyancy units, 28 to a section, spaced at, for example, 100 ft. intervals, and the entire structure is braced by diagonal struts 15 and longitudinal and transverse ties or struts 17.

The buoyancy units, while all generally similar, are of three distinct types, designated as 19, 21 and 23 respectively. All of these buoyancy units comprise a plurality of annular compartments 25 forming the main buoyancy tanks, and a plurality of larger annular compartments 27 positioned below the compartments 25. All compartments are provided with radial partitions 26. The uppermost of the compartments 27, designated 27a, is provided with means for flooding and for blowing out, and forms an auxiliary buoyancy tank. The lower compartments 27 serve as fuel, etc., storage compartments.

The buoyancy units 19, of which there are six for each section, are provided with haul down mechanism, as shown in Fig. 6. A crown block 29 is secured to the deck structure immediately above the central aperture 31 through the buoyancy unit defined by the compartments 25, 27. A winch 33 is positioned within a compartment 34 communicating with aperture 31 and is driven by two electric motors 35, as shown in Fig. 7. The aperture 31 is tightly sealed at the top, as is compartment 34, so that the pressure of air trapped therein may protect the winch system from immersion in water during submergence of the structure. The tackle 37 extends down through the opening 31 and is adapted to be connected to the anchorage cable support buoys 39. Anchorage is secured by means of weight type anchors 41 of the type customarily employed for seadrome anchorage. The haul down mechanism is essentially similar to that used to support the drill stem in the drilling of oil wells, and is designed to exert a down-haul of over 175 tons, and to maintain a uniform tension on the winch lines during emergence.

Figure 9:
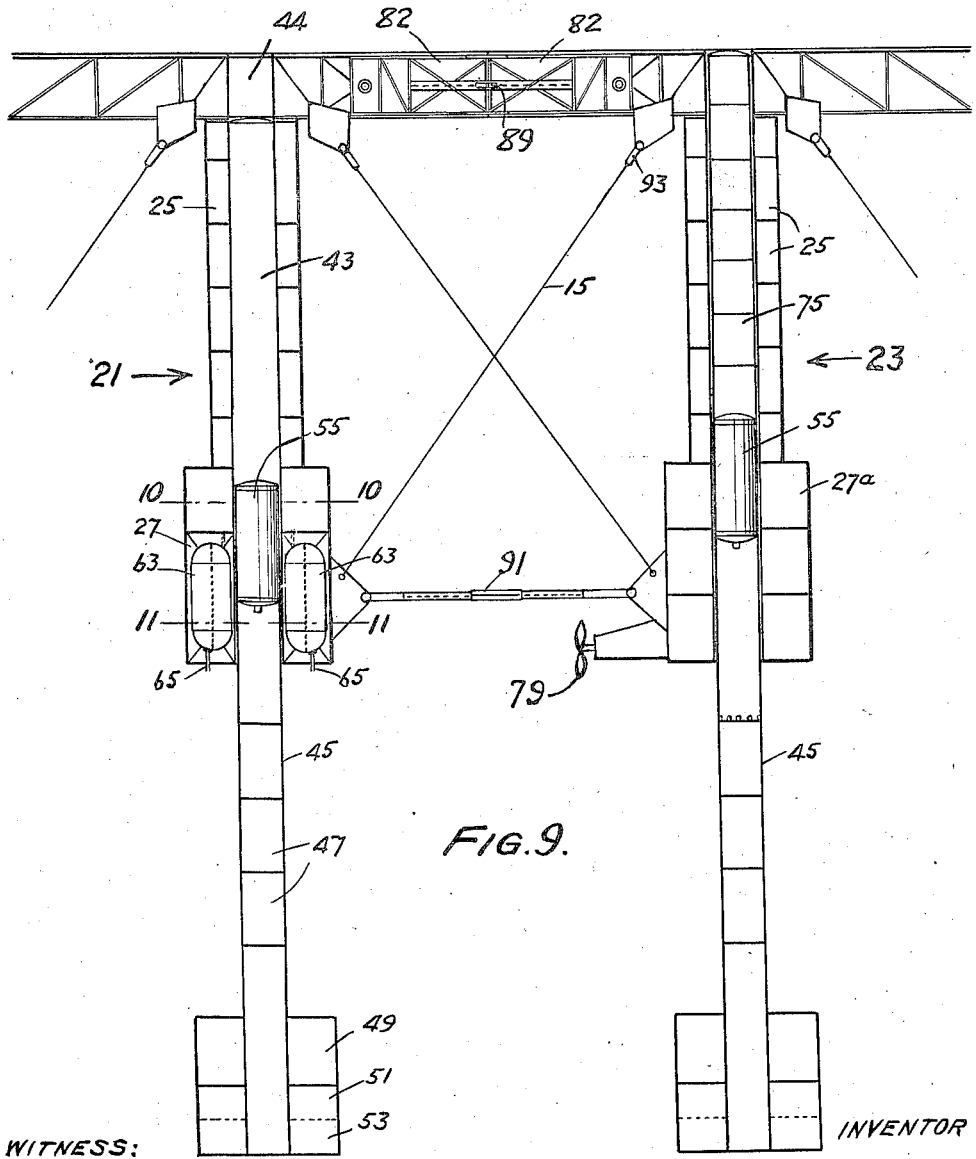
Figure 9 is a diagrammatic view of a portion of the seadrome structure showing a third type of buoyancy unit and associated storage space.

The buoyancy units 21, of which there are 18 for each section, have a central aperture 43 defined by the compartments 25, 27, of larger diameter than that of the haul down units 19. As shown in Fig. 9, this aperture is adapted to receive the column 45 of a ballast unit, which can be telescoped within the buoyancy unit. The ballast unit comprises a column 45 which is divided into compartments 47, and two cylindrical ballast tanks of larger diameter. The upper ballast tank 49 may be flooded or blown out, while the lower tank 51 is adapted to contain suitable ballast 53. A compressed air reservoir 55 is secured in the upper end of column 45 and suitable connection is made with ballast tank 49 and auxiliary buoyancy tank 27a. Locking means may be provided for locking together, when desired, the buoyancy unit 21 and the associated ballast unit. A storage compartment 44 closes each aperture 43 at the top.

The compartments 27 of the buoyancy units may be arranged for fuel and oil storage as shown in Figs. 9 to 12. Within each of the sections into which the compartment 27 is divided by partitions 26 is positioned a storage drum 63. A flexible, expansible diaphragm 69, of oil and gasoline resistant material, as neoprene, Thiokol, etc., divides the drum 63 vertically into a fuel storage chamber 71 and a chamber 73 open to the sea through connections 65.

Fuel is pumped into the chambers 71 against the hydrostatic pressure resulting from the difference in specific gravities, and is discharged at need to the flight deck by such pressure. The construction shown also minimizes change in buoyancy on dispensing large amounts of fuel or oil, and serves to strengthen the buoyancy tank structure to resist under-water explosions, since the internal and external pressures are to some extent equalized.

The power units 23, of which there are four for each section, arranged along the after edge of the section, are identical with units 21 except for the omission of storage compartments 44, and in that the column 45 of the ballast unit is continued above the compressed air tank 55 to form compartments 75, and propulsion units 79 are secured to the buoyancy tank structure 27.

The several compartments 75 serve to provide living quarters for the crew, engine room space for Diesels to supply power requirements when not submerged, and a control room. The propulsion units 79 comprise screws driven by electric motors, powered ordinarily from generators driven by the Diesels. The generators may also serve to charge batteries to drive the winch motors 35 and the compressor motors for the air compressors, located in the control units, which supply air to the tanks 55 of all units.

The control mechanism in each unit 23 will govern the submergence and emergence of each unit 23, and of the seadrome as a whole. By blowing out the ballast tank 49 of any control unit 23, the compartments 75 may be raised high above the flight deck, as shown in Fig. 6, or may be brought above the ocean surface while the seadrome as a whole remains submerged, as shown in Fig. 5. The air compressors can thus be operated even when the seadrome is submerged. Periscope mechanism 77, which may be raised or lowered from the topmost compartment 75, permits the necessary observation before emergence.

Means for locking the several seadrome sections together are shown schematically in Figure 14. Secured to an extension of the truss system 11 of each adjoining section is a comparatively short truss member 82. The connection is such that members 82 are free to move somewhat about their connection 83 with the truss system 11 as a pivot. The two truss members 82 are secured together, with plates carried thereby overlapping one another, by a yielding connection. Thus each truss member 82 may carry a draft bar 87, and the two draft bars may be connected by heavy automatic couplers 89 of the type used in railway draft gear, with the usual spring connections to absorb violent stresses.

The cross struts 17a may be similarly connected by automatic couplers operating within a sleeve 91. The diagonal stays or braces 15 may be secured to the truss system 11 by releasable connections 93. by these means the several sections of the seadrome may be quickly released in emergency, while readily assembled on location.

Instead of utilizing permanently located anchors 41 marked by buoys 39, special anchors may be carried by the buoyancy units 19, as shown in Figs. 16 and 17.

Each of the anchors 93 is formed as a shell divided into a plurality of radial sections, each of which in turn is divided into a buoyancy compartment 95 and a ballast compartment 97. A central section 99 forms a cable tank. One end of the cable 101, which may be sectionalized for easy shortening or lengthening, is attached to the anchor terminal 103; the other end, to the tackle 37 of the haul down mechanism. A releasable clamp 105 may be used to clamp the ends of cable 101 together to hold the anchor in raised position. An air hose 107 may be clipped to the cable 101 and connected with the buoyancy compartments 95 of the anchor. Vents 109, so positioned as to be free from danger of clogging, permit the buoyancy compartments to be flooded or blown out, and serve to equalize internal and external pressures.

Each anchor 93 is designed to have a net effective weight when flooded of 200 tons, and to be free floating when the buoyancy tanks are completely blown out. The ballast in compartment 97 preserves the trim. The reserve buoyancy of the airdrome, when submerged, will be about 135 tons per anchor.

The seadrome will proceed under its own power, or may be towed to the anchorage site, each section proceeding separately. To facilitate such operation, the structure should be positioned so as to have as little draft as possible. This object may be accomplished by blowing out the water from the ballast tanks 49 of each ballast unit so that the unit will rise until it reaches the bottom of the coresponding buoyancy unit, with its column 45 telescoped within the central aperture 43 of the buoyancy unit. At the same time the auxiliary buoyancy tanks 27a will be blown out so as to give maximum buoyancy to the structure. In this condition the seadrome will ride substantially in the position shown in Fig. 14.

It may be desirable, in order to reduce drag, to provide each of the ballast units with a fairwater 81 surrounding the tanks 49 and 51, as shown in Figs. 14 and 15.

When the several sections of the seadrome have arrived at the anchorage site selected, which will ordinarily be in water not exceeding 200 fathoms in depth, the several sections are locked together in the manner described above, and the haul down lines 37 secured to the anchorage cable buoys. At substantially the same time, the ballast units will be lowered by flooding the ballast tanks 49 so that they will assume the position shown in Fig. 1, in which position they may be locked. This operation insures that the center of gravity will be below the center of buoyancy and thus insures stability in the seadrome.

If anchors of the type shown in Figs. 16 and 17 are used, the anchors will be placed in position beneath the buoyancy units 19 before the several sections of the seadrome leave the shipyard. The anchor once in place can be given sufficient buoyancy to retain it firmly in position. If desired, the clamps 105 may be set and a tension of about 50 tons placed on the haul down system, to hold the anchor more securely. When the anchorage site is reached the clamps 105 will be released, and the compartments 95 flooded, whereupon the anchor will sink to the bottom at a controlled rate, paying out cable 101 from tank 99 as it sinks.

In either case, after anchoring has been accomplished the several haul down winches 33 in the haul down buoyancy units 19 are then operated to bring the seadrome into the desired surface position. In this position, which is shown in Fig. 3, the flight deck will be approximately 60-65 feet above the water level, a height sufficient to provide ample clearance for even the greatest ocean waves. By proper adjustment of the auxiliary buoyancy tanks 27a, the seadrome will be given a residual buoyancy of about 3,000 tons, which is absorbed uniformly by the haul down cables.

This residual buoyancy may be changed at will; for example, in anticipation of the landing of a large flight of aircraft. Thus, for example, it is easily possible, by continuing the blowing out of the auxiliary buoyancy tanks 27a, to give an additional 1200 tons of buoyancy. This would permit the landing of a squadron of sixty 20-ton bombers upon the flight deck, with no change in the trim or water line of the seadrome, the only change being in the tension on the haul down cables.

When it is desired to submerge the seadrome, the auxiliary buoyancy tanks 27a are flooded. This action alone will bring the seadrome into the position indicated in Fig. 4 with the flight deck just above the water level. The haul down winches are then operated to cause the structure to submerge, and the operation is continued until the flight deck is about 50 feet below water level, as shown in Fig. 5.

When the seadrome is in submerged position, the operators in any of the control rooms 75 can, by blowing the ballast tank 49 of the associated ballast unit, cause the control room to be raised above the level of the flight deck, if desired, to an extent that the upper portion will be above water level. Before causing the control room to emerge above water level, the periscope equipment contained therein may be utilized to make the desired observations.

The operators, from the control rooms, may cause the emergence of the seadrome by releasing the haul down tension and blowing out the auxiliary ballast tanks 27a with the compressed air contained in the tanks 55. This action will cause the rapid emergence of the seadrome to its normal water line (that shown in Fig. 3) in about twelve minutes, assuming an emergence speed of something less than ten feet per minute. Level and regular emergence is maintained by insuring uniform tension on the haul down winch lines. The winches, as previously indicated, are of the type which permits a uniform and regulable tension to be maintained at all times upon the winch line during operation.

After emergence to the normal water line, the haul down tension may be equalized, if that seems to be necessary, and then held while the operation of the blow tanks may be continued, as previously described, to produce additional buoyancy to take care of the landing of planes.

During the time that the seadrome is above the surface, the air compressors 59 are operated to charge the blow tanks 55 with compressed air ready for use on the next submergence.

It will be appreciated that the several blow tanks 55 may all be interconnected with one another with suitable valves so that any or all of the blow tanks may be used for blowing water out of any or all of the auxiliary buoyancy tanks 27a or ballast tanks 49. The required remote control mechanism for operation of the buoyancy, ballast and blow tanks, the propulsion units, the compressor motors, and the motors for the haul down winches, may be set up in interlocking arrangement, with duplicate operating controls in any number of the control rooms 75.

If, when using anchorage of the type shown in Figs. 16 and 17, it should be desired to change the anchorage position while in the service draft, the winch system would be used to put a strain of from 200 to 250 tons on each anchor in succession. Should the bottom suction (so-called) be such that some of the anchors cannot be made to "break ground" while under this stress, the connecting hose lines 107 can be used to accomplish this purpose. By pumping water into the anchor through these lines, the flow through the outlet ports 109 may equalize the pressure. If this is not effective, compressed air may be used to make the anchor sufficiently buoyant, when combined with the winch stress, to release it from the bottom. Under the latter condition as the anchor approaches the surface, the air pressure in the buoyancy compartment 95 of the anchor would automatically equalize by expanding out through the outlet ports 109, the final buoyancy being regulated to that desired by the release of the air from the buoyancy tank 95 through the air line hose connection 107.

Should circumstances require that the anchor be retracted a greater distance than the length of the winch column 37 (the maximum distance between the crown block and the traveling block) provision is made to shorten the anchorage cable 101 in sections, in accordance with the procedure used in oil well drilling practice.

When on service duty at the ocean surface, weather conditions may develop excessive stress on the anchor cables due to their relatively vertical position. To meet this possibility, sufficient excess cable should be provided in the winch block line 37 to permit the anchor cables to be quickly lengthened, greatly reducing the stress on the cable system.

It will be appreciated that the structure described, while primarily intended as a seadrome, will possess other uses, as, for example, as an offshore drilling rig, etc.

What I claim and desire to protect by Letters Patent is:

1. A seadrome of the type described comprising a landing deck, a supporting structure therefor, a plurality of buoyancy units secured in spaced relation in and forming a part of the supporting structure, said buoyancy units in the aggregate giving the seadrome substantial residual buoyancy when riding at service draft, some of said buoyancy units having a central shaft open at the bottom and closed at the top, a closed chamber in communication with the top of each shaft, hoisting means in said shaft adapted to be connected to anchorage lines and a winch in each chamber connected to the hoisting means in the shaft.

2. A seadrome of the type described comprising a landing deck, a supporting structure therefor, a plurality of buoyancy units secured in spaced relation in and forming a part of the supporting structure, said buoyancy units in the aggregate giving the seadrome substantial residual buoyancy when riding at service draft, some of said buoyancy units having a central shaft open at the bottom, a buoyancy column slidably mounted in the shaft of some of said units, a ballast tank connected to the lower end of each of said columns, a compressed air reservoir above each column adapted to displace ballast sea water from the ballast tank, and living quarters for the crew in movable compartments in some of the shafts above the air reservoir.

3. A seadrome of the type described comprising a landing deck, a supporting structure therefor, a plurality of buoyancy units secured in spaced relation in and forming a part of the supporting structure, said buoyancy units in the aggregate giving the seadrome substantial residual buoyancy when riding at service draft, some of said buoyancy units having a central shaft open at the bottom, the lower portions of some of said units being enlarged at the lower end to form chambers for power units, a propeller mounted on the end of a shaft extending from a power unit chamber, a buoyancy column slidably mounted in the shaft of each of said units, a ballast tank connected to the lower end of each of said columns, a compressed air reservoir above each column adapted to displace ballast sea water from the ballast tank, living quarters for the crew in movable compartments above each reservoir, and a periscope extending above the upper compartment, said compartments being adapted to be elevated above the landing deck.

4. A seadrome of the type described comprising a landing deck, a supporting structure therefor, a plurality of buoyancy units secured in spaced relation in and forming a part of the supporting structure, said buoyancy units in the aggregate giving the seadrome substantial residual buoyancy when riding at service draft, some of said buoyancy units having a central shaft open at the bottom, a buoyancy column slidably mounted in the shafts of some of said units, a ballast tank connected to the lower end of each said columns, a compressed air reservoir above each column adapted to displace ballast sea water from the ballast tank, living quarters for the crew in movable compartments in some of the shafts above the air reservoir and a storage space in the deck at the top of other shafts.

5. A seadrome section of the type described comprising a landing deck, a supporting structure therefor, there being at least four rows each containing seven buoyancy units extending downwardly from and connected to the supporting structure, said units being spaced apart substantially the same distance both longitudinally and transversely beneath the deck, each of said units having a central shaft open at the lower end, the shafts of the second, third and fifth unit of the outer rows, having hoisting means therein adapted to be connected to anchorage lines, a buoyancy column slidably mounted in each of the shafts of the other units and a ballast tank at the lower end of each of said buoyancy columns.

EDWARD R. ARMSTRONG.